(12) United States Patent
Seeger

(10) Patent No.: US 11,533,460 B2
(45) Date of Patent: Dec. 20, 2022

(54) HIGH DYNAMIC RANGE AND WIDE COLOUR GAMUT COMFORT MEASUREMENT AND FEEDBACK

(71) Applicant: NBC UNIVERSAL MEDIA, LLC, Universal City, CA (US)

(72) Inventor: Arley Christopher Seeger, Rockville Ctr, NY (US)

(73) Assignee: NBC UNIVERSAL MEDIA, LLC, Universal City, CA (US)

( * ) Notice: Subject to any disclaimer, the term of this patent is extended or adjusted under 35 U.S.C. 154(b) by 207 days.

(21) Appl. No.: 16/945,607

(22) Filed: Jul. 31, 2020

(65) Prior Publication Data
US 2021/0076018 A1    Mar. 11, 2021

Related U.S. Application Data

(60) Provisional application No. 62/899,090, filed on Sep. 11, 2019.

(51) Int. Cl.
| H04N 9/64 | (2006.01) |
| H04N 9/69 | (2006.01) |
| H04N 9/73 | (2006.01) |
| G06T 7/90 | (2017.01) |
| G06V 20/40 | (2022.01) |

(52) U.S. Cl.
CPC .............. H04N 9/646 (2013.01); G06T 7/90 (2017.01); G06V 20/46 (2022.01); H04N 9/69 (2013.01); H04N 9/73 (2013.01)

(58) Field of Classification Search
CPC .......... G06T 7/90; G06V 20/46; G06V 20/40; G06V 20/41; G06V 20/42; G06V 20/43; G06V 20/44; G06V 20/47; G06V 20/48; G06V 20/49; H04N 9/646; H04N 9/69; H04N 9/73; H04N 9/77; H04N 9/83; H04N 9/87; H04N 11/00; H04N 13/111; H04N 11/20

See application file for complete search history.

(56) References Cited

U.S. PATENT DOCUMENTS

| 2010/0290667 | A1* | 11/2010 | Lienhart | G06Q 30/0241 |
| | | | | 382/100 |
| 2014/0153902 | A1* | 6/2014 | Pearson | G11B 27/031 |
| | | | | 386/278 |
| 2015/0341611 | A1* | 11/2015 | Oh | H04N 5/775 |
| | | | | 386/230 |
| 2015/0371677 | A1* | 12/2015 | White | H04L 65/403 |
| | | | | 715/720 |
| 2017/0085896 | A1* | 3/2017 | Ramasubramonian | |
| | | | | H04N 19/463 |
| 2017/0278289 | A1* | 9/2017 | Marino | G06T 11/60 |

* cited by examiner

*Primary Examiner* — Bobbak Safaipour
*Assistant Examiner* — Duy Tran
(74) *Attorney, Agent, or Firm* — Lee, Hong, Degerman, Kang & Waimey PC

(57) ABSTRACT

Systems and methods for processing video content are disclosed. According to at least one embodiment, a method of processing video content includes: receiving the video content; identifying a portion of the video content based on one or more of a plurality of factors, the plurality of factors including colour, raster percentage, brightness, and temporal factors; and providing an indicator that facilitates visual recognition of the identified portion of the video content.

18 Claims, 5 Drawing Sheets
(2 of 5 Drawing Sheet(s) Filed in Color)

HIGH DYNAMIC RANGE AND WIDE COLOUR GAMUT COMFORT MEASUREMENT AND FEEDBACK

CROSS-REFERENCE TO RELATED APPLICATION(S)

Pursuant to 35 U.S.C. § 119(e), this application claims the benefit of U.S. Provisional Patent Application Ser. No. 62/899,090, filed on Sep. 11, 2019, the contents of which are hereby incorporated by reference herein in their entirety.

BACKGROUND

High-dynamic-range imaging (HDRI) is a technique used in imaging and/or photography to reproduce a greater dynamic range of luminosity (or brightness) than is possible using standard dynamic range imaging or photographic techniques. Wide Colour Gamut (WCG) imaging and/or photography techniques are used to reproduce a larger palette. Accordingly, HDR/WCG content, including HDR video content, is better able to present a range of luminance and saturation similar to what is experienced through the human visual system. The human visual system is constantly able to adjust and/or adapt to a broad range of chromaticity and luminance that is present in its surrounding environment. The information sensed by the eye is interpreted so that a viewer is able to see in a wide range of lighting conditions.

Because HDR and WCG techniques can reproduce a greater dynamic range of colour volume (HDR+WCG), HDR/WCG video is suitable for capturing an image or a scene featuring bright objects and more saturated colours (e.g., bright lights and very colourful scenes) as well as considerably less bright objects while including increased detail (e.g., dark background regions). Conventional display devices (e.g., conventional televisions) are not configured to display the range of luminosity or chromaticity that can be captured by HDR and WCG video. However, devices that are so configured have become commercially available. The capabilities of these devices will be improving even more in the near future. Such devices may be configured to reproduce a range that is, e.g., 10 times as large compared to conventional display devices.

SUMMARY

With respect to various embodiments disclosed herein, techniques are described for improving presentation of HDR and WCG content on display devices. Viewing such content may cause discomfort, when the content features, e.g., large objects, that are uncomfortably bright or very saturated. Aspects of this disclosure are directed to reduce the likelihood of such occurrences. Accordingly, the content viewer's comfort may be improved.

According to at least one embodiment, a method for processing video content is disclosed. The method includes: receiving the video content; identifying a portion of the video content based on one or more of a plurality of factors including colour, raster percentage, brightness, and temporal factors; and providing an indicator that facilitates visual recognition of the identified portion of the video content.

According to at least one embodiment, a machine-readable non-transitory medium has stored thereon machine-executable instructions for processing video content. The instructions include: receiving the video content; identifying a portion of the video content based on one or more of a plurality of factors, the plurality of factors including colour, raster percentage, brightness, and temporal factors; and providing an indicator that facilitates visual recognition of the identified portion of the video content.

According to at least one embodiment, a system for facilitating processing of video content includes one or more controllers configured to: receive the video content; identify a portion of the video content based on one or more of a plurality of factors, the plurality of factors including colour, raster percentage, brightness, and temporal factors; and provide an indicator that facilitates visual recognition of the identified portion of the video content.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects and features of the present disclosure will become more apparent upon consideration of the following description of embodiments, taken in conjunction with the accompanying drawing figures.

DETAILED DESCRIPTION

Figure 1:
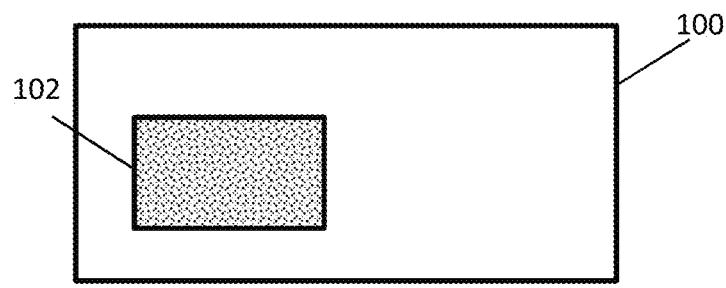
FIG. 1 illustrates a display screen displaying content.

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

A nit is an example of a measurement unit of luminance, or the intensity of visible light, where one nit is equal to one candela per square meter. Televisions (or display devices) employing cathode-ray tube (CRT) technology are designed to produce (or display) approximately 100 nits. Recent televisions (e.g., televisions employing backlit liquid-crystal display (LCD) technology), OLED are designed to produce about 400 to 4000 nits. However, this reproduction may be based merely on stretching (or scaling up) SDR source video that was originally designed to be displayed at around 100 nits and therefore only uses a minimal portion of the display's capabilities in peak brightness. As such, these standard dynamic range (SDR) video displays are unable to display the level of detail associated with HDR/WCG video.

Even more recent display devices can display higher levels of detail. Such devices are designed to produce typically between 500 to 4000 nits. Further, it is expected that display devices of the future will be able to produce greater than 4000 nits (e.g., up to 10,000 nits using the perceptual quantization (PQ) transfer function). Such devices will be able to display more of the dynamic range that is captured by HDR/WCG video.

Aspects of this disclosure are directed to providing one or more indicators to producers of HDR content (e.g., video professionals who capture or process HDR/WCG content). The indicators indicate the presence of content that may be uncomfortably bright for at least a subset of viewers. The indicators may be provided concurrent with the capturing of the content.

According to at least one embodiment, the indicators may be provided according to procedures following rules by the Federal Communications Commission (FCC) or other governmental agencies requiring commercials to have the same average volume as the programs they accompany. For example, some rules are set forth in the Commercial Advertisement Loudness Mitigation (CALM) Act, which guards against the broadcast of television commercials that seem louder than accompanying programming. Various embodiments of this disclosure enable media providers to guard against the display of HDR/WCG content that may be too "loud" (e.g., uncomfortably bright and/or saturated) for some viewers.

According to at least one embodiment, an indicator is provided in response to identifying a particular portion of HDR/WCG content that may be of concern. This identification may be based on one or more of multiple factors. Such factors include colour, raster percentage, brightness, and temporal factors.

Colour—the human visual system typically views certain colours perceptually as being more uncomfortable (e.g., physiologically uncomfortable) to view compared to other colours when too bright or saturated. For example, certain colours (e.g., white (all primaries), yellow (a compound colour), green and red) may typically be more uncomfortable to view than other colours (e.g., blue). Accordingly, displayed objects that are of a colour among the former group (e.g., white, yellow, green and red) may tend to cause a greater degree of discomfort as the brightness level of the object increases. By way of example, a red object that is displayed at a particular brightness level (e.g., HDR/WCG 100% Red) might be perceived as being more uncomfortable (or more offensively bright) to view than a blue object that is displayed at the same level. For example, it may be more likely that such a red object (as opposed to such a blue object) causes a viewer to squint uncomfortably. Although examples of colours have been described by way of example with respect to groups, it is understood that these and other colours may be further defined.

For example, how different colours may be perceived will be described with reference to FIG. 3, which illustrates examples of objects of various colours.

Figure 3:
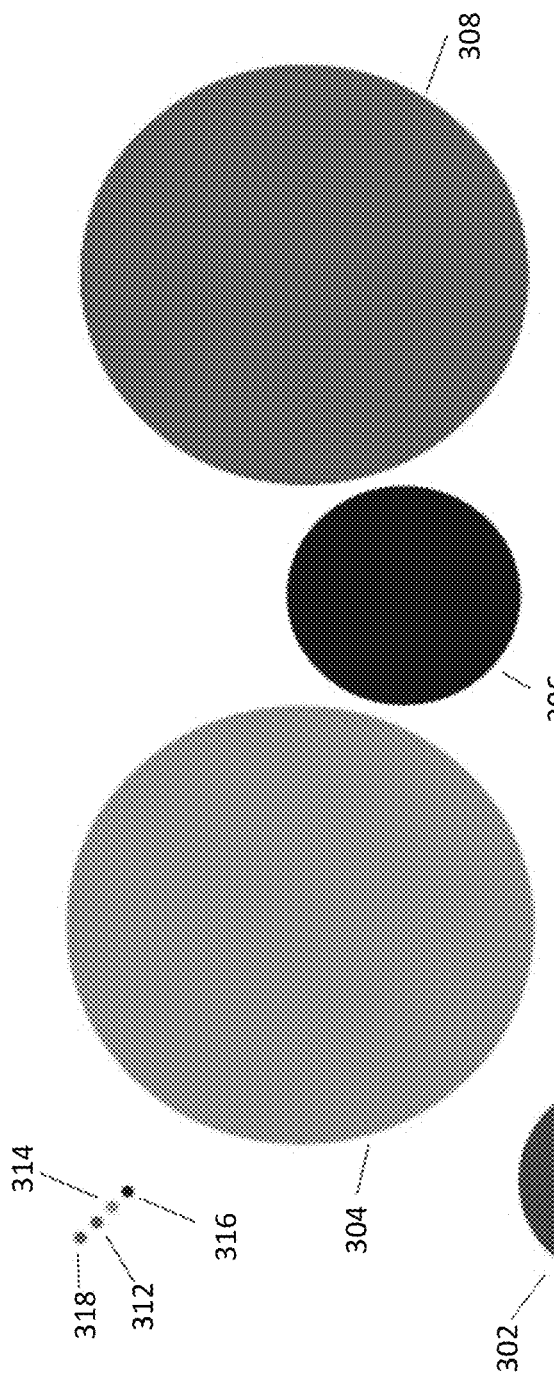
FIG. 3 illustrates examples of objects of various colours and sizes.

FIG. 3 illustrates a red circle 302, a green circle 304, a blue circle 306 and a magenta circle 308. Relative to the blue circle 306, the red circle 302 may be more uncomfortable to view. For example, relative to the blue circle 306, it may be more uncomfortable to view the red circle 302 over a particular period of time.

Similarly, relative to the blue circle 306, the green circle 304 and the magenta circle 308 may be more uncomfortable to view. Magenta may be perceived as being more "offensive" than blue because the colour magenta may be created by a combination of colours that include not only blue, but also red.

As such, a portion of HDR/WCG content may be identified as being of concern based, at least in part, on the portion triggering display of one or more objects of a colour in a first group of colours (e.g., white, yellow, green and red) as opposed to a second group of colours (e.g., blue).

Raster percentage—the human visual system typically views an object that is of at least a particular size as attracting more attention than an object of a lesser size. By way of example, a first object that is displayed at a particular brightness level (e.g., 900 nits white) and that occupies more than a threshold number of pixels might be perceived as being more uncomfortable to view (e.g., uncomfortably bright) than a second object that is displayed at the same brightness level but occupies a number of pixels that is smaller than the threshold number of pixels. In an aspect, the occupied pixels may be a group of adjacent pixels at which a particular object is displayed. The raster percentage may be the percentage of the raster that is formed by the occupied pixels. In this situation, the second object might be perceived as a highlight that is of interest, rather than as an uncomfortable annoyance.

For example, a displayed object having a size that equals or exceeds a raster percentage (e.g., an object occupying at least a threshold percentage of the display screen) may tend to attract more attention than a displayed object having a smaller size. If such an object is displayed at a particular brightness level (e.g., 900 nits white), then it may be more likely that viewer discomfort is triggered. By way of example, for a display device having a screen not larger than 65 inches in diameter, the threshold percentage may be 15%, 50%, or 60% of the size of the display screen. It is understood that a display device having a screen that is larger than 65 inches may have a different percentage threshold(s). In other words, the percentage threshold may be a function of the physical screen size. In addition, it is understood that the percentage threshold(s) may vary based on the particular standard(s) used for capturing the video.

For example, how different sizes of same-coloured objects may be perceived will be described with reference to FIG. 3, which illustrates examples of objects of various colours and sizes.

In addition to illustrating the red circle 302, the green circle 304 and the magenta circle 308, FIG. 3 illustrates a red circle 312, a green circle 314, a blue circle 316 and a magenta circle 318. As illustrated in FIG. 3, the sizes of the red circle 302, the green circle 304, the blue circle 306 and the magenta circle 308 are significantly larger than the respective sizes of the red circle 312, the green circle 314, the blue circle 316 and the magenta circle 318. Therefore, if displayed on a given display screen, the red circle 302, the green circle 304 and the magenta circle 308 would occupy a higher raster percentage than the red circle 312, the green circle 314, the blue circle 316 and the magenta circle 318, respectively.

Although the colours of particular pairs of circles in FIG. 3 are identical (e.g., the colour of the circle 314 and the colour of the circle 304 are identical), the larger circles in each pair may be more uncomfortable to view. However, this may not pertain to colours (e.g., blue) that do not tend to be uncomfortable to view (e.g., see blue circle 306, which may be much less likely to cause discomfort to the human visual system, relative to blue circle 316).

For example, relative to the green circle 314, the green circle 304 may be more uncomfortable to view. Although the colour of the circle 314 and that of the circle 304 are identical, perception of the larger circle 304 may be significantly different from perception of the smaller circle 314 due to the difference in size.

Similarly, relative to the red circle 312 and the magenta circle 318, the red circle 302 and the magenta circle 308, respectively, may be more uncomfortable to view. Again, the potential differences in perception may be due to the corresponding differences in size between same-coloured circles.

It is appreciated that, when displayed at HDR levels of brightness, the potential differences in perception (e.g., with respect to same-coloured objects of different sizes) may be even more extreme.

As such, a particular portion of HDR/WCG content may be identified as being of concern based, at least in part, on the portion triggering display of one or more objects that are of a particular raster percentage or larger.

Brightness level—objects that are displayed at a brightness level that is at or above a brightness threshold may be perceived as an object causing discomfort to the human visual system. For example, the threshold level may be 500 nits or some other value depending on size, colour, and/or temporal values.

Temporal aspects—objects that are displayed for longer than a threshold duration of time may be perceived as an annoyance. By way of example, an object that is displayed at a brightness level (e.g., 900 nits) for over a threshold duration might be perceived as being more uncomfortable to view (e.g., uncomfortably bright) than another object that is displayed at the same brightness level but for a shorter duration that is less than the threshold duration. In this situation, the intentional display of the latter object might be desired, for example, to trigger a particular emotional response and, accordingly, might be perceived as a highlight that is of interest, rather than as an uncomfortable annoyance.

As described earlier, the identification of a portion of HDR/WCG content that may be of concern, may be based on one or more of multiple factors, including colour, raster percentage, brightness, and temporal factors. According to one or more further embodiments, the identification may be based on some combination of two of more of such factors. By way of example, if a portion includes display of a white-coloured object that occupies at least a particular percentage of the display screen and that is displayed at a brightness level that is at or above a particular threshold, then the portion is identified as being of concern. In some instances, different colours (or groups of colours) may be associated with different brightness level thresholds for determining when an object should be classified as being of concern.

Upon making such an identification, an indicator may be provided to inform a user that the identification has been made.

According to various embodiments, the indicator may be directed to a user associated with the production or capturing of HDR/WCG content (e.g., a cameraperson, a video engineer, etc.). In a first example, the indicator may be a pattern that is overlaid on top of the portion of the image of concern, where the pattern overlay is shown on the display of a capture device (e.g., a video camera) during film or television production. According to various embodiments, the indicator may be directed to a user associated with the post-production or transmission (e.g., wireless transmission, broadcast transmission, etc.) of HDR/WCG content. In a second example, the indicator may be a pattern overlaid on top of the portion of the image within a display of a video editing room.

Once the user is made aware of the potential issue, then the user may take steps to address the issue. In the first example, a cameraperson may make one or more equipment adjustments to adjust (e.g., lower) a brightness level for capturing the underlying object that is at issue. In the second example, a quality-control transmission engineer may make one or more processing adjustments to achieve a similar result at a post-production stage.

As discussed, the indicator may take the form of a visual indicator. For example, according to at least one embodiment, the indicator is provided in the form of a visual overlay that coincides with the portion of the content that is at issue. With reference to FIG. 1, a display screen 100 displays HDR/WCG content. For example, the display screen 100 may be monitored by a cameraperson while capturing HDR/WCG content.

As the HDR/WCG content is captured (e.g., concurrent with the capturing of the HDR/WCG content), a portion of the content may be identified as being of concern. As described earlier, the identification may be based on one or more of multiple factors, including colour, raster percentage, brightness, and temporal factors. By way of example, a portion is identified in response to the portion including (or causing) display of a white-coloured object that occupies at least a threshold percentage of the display screen and that is displayed at a brightness level that is at or above a threshold. With continued reference to FIG. 1, a visual indicator 102 is provided at the display screen 100. The location of the visual indicator 102 coincides with the portion of the content that is identified. For example, the visual indicator 102 may be superimposed on the portion of the content that is identified.

Figure 2:
FIG. 2 illustrates an example of a zebra pattern.

Although the visual overlay 102 is illustrated in FIG. 1 as a patterned rectangle, it is understood that the visual overlay 102 may take other forms. For example, the visual overlay 102 may have a shape other than a rectangular shape, such as a shape similar to the shape of the content that is identified. For example, the visual overlay 102 may have other patterns. According to at least one embodiment, such patterns may exclude a zebra pattern 200 such as that which is illustrated in FIG. 2. In this manner, the pattern of the visual overlay 102, which may effectively identify existence of a perceptual issue, is more readily distinguishable from a zebra pattern, which is conventionally used to identify existence of a technical issue (e.g., clipping).

In conventional camera systems, an overlay having a zebra pattern (e.g., zebra pattern 200 of FIG. 2) is often used as a technical marker. For example, such an overlay may be used to identify regions that are overexposed and/or regions where a particular technical limit (e.g., a broadcast-related standard) is reached or exceeded. To more strongly distinguish the appearance of the visual overlay 102 from an overlay that identifies a technical issue (as opposed to a perceptual issue), the visual overlay 102 may have a pattern that is noticeably different from a zebra pattern.

As another example, the visual overlay 102 may take the form of a logo that is superimposed over the portion of the content that is identified. As yet another example, the visual overlay 102 may be presented as a modified (or further processed) version of the identified portion. For example, if the portion includes display of a red-coloured object that may be uncomfortably bright, the visual overlay 102 may be presented as a red object having a reduced (or attenuated) brightness.

Upon recognizing the indicator (e.g., visual overlay 102), the user (e.g., the cameraperson monitoring the display screen 100 while capturing HDR/WCG content) may perform steps to address the underlying issue.

According to at least one embodiment, a method for processing video content includes: receiving the video content; identifying a portion of the video content based on one or more of a plurality of factors, the plurality of factors including colour, raster percentage, brightness, and a temporal factor; and providing an indicator that facilitates visual recognition of the identified portion of the video content.

According to at least one further embodiment, identifying the portion of the video content includes: determining a colour associated with an object displayed in the portion of the video content; determining a raster percentage corresponding to the displayed object; determining a brightness threshold associated with the determined colour and the determined raster percentage of the portion of the video content; and measuring the brightness level of the video content. Providing the indicator includes: determining to generate the indicator for the portion of the video content based on the measured brightness level of the video content as compared to the determined brightness threshold, the determined colour, and the determined raster percentage; and generating the indicator to have a size sufficient to overlay the portion of the video content.

According to at least one further embodiment, identifying the portion of the video content includes: determining a colour associated with an object displayed in the portion of the video content; identifying a colour group to which the determined colour corresponds; determining a raster percentage corresponding to the displayed object; determining a brightness threshold associated with the identified colour group and the determined raster percentage of the portion of the video content; and measuring the brightness level of the video content. Providing the indicator includes: determining to generate the indicator for the portion of the video content based on the measured brightness level of the video content as compared to the determined brightness threshold, the determined colour group, and the determined raster percentage; and generating the indicator to have a size sufficient to overlay the portion of the video content.

According to least one further embodiment, identifying the portion of the video content includes: determining a colour associated with an object displayed in the portion of the video content; determining a raster percentage corresponding to the displayed object; determining a brightness threshold associated with the determined colour and the determined raster percentage of the portion of the video content; measuring the brightness level of the video content; determining a duration for which the portion of the video content is to be displayed; and determining a duration threshold based on at least one of the determined colour, the determined raster percentage, or the measured brightness level. Providing the indicator includes: determining to generate the indicator for the portion of the video content based on the measured brightness level of the video content as compared to the determined brightness threshold, the determined colour, the determined raster percentage, the determined duration, and the determined duration threshold; and generating the indicator to have a size sufficient to overlay the portion of the video content.

According to at least one further embodiment, identifying the portion of the video content includes: determining a colour associated with an object displayed in the portion of the video content; identifying a colour group to which the determined colour corresponds; determining a raster percentage corresponding to the displayed object; determining a brightness threshold associated with the identified colour group and the determined raster percentage of the portion of video content; measuring the brightness level of the video content; determining a duration for which the portion of the video content is to be displayed; and determining a duration threshold based on at least one of the determined colour group, the determined raster percentage, and the measured brightness level. Providing the indicator further includes: determining to generate the indicator for the portion of the video content based on the measured brightness level of the video content as compared to the determined brightness threshold, the determined colour group, the determined raster percentage, the determined duration, and the determined duration threshold; and generating the indicator to have a size sufficient to overlay the portion of the video content.

According to at least one further embodiment, the method further includes generating a recommendation for the portion of the video content, the recommendation indicating at least one adjustment to a colour, raster percentage, brightness level, or the temporal factor associated with the portion of the video content, wherein the recommendation enables a user to adjust the portion of the video content so that the portion is within acceptable video parameters and regulations; and providing the generated recommendation to the user.

Figure 4:
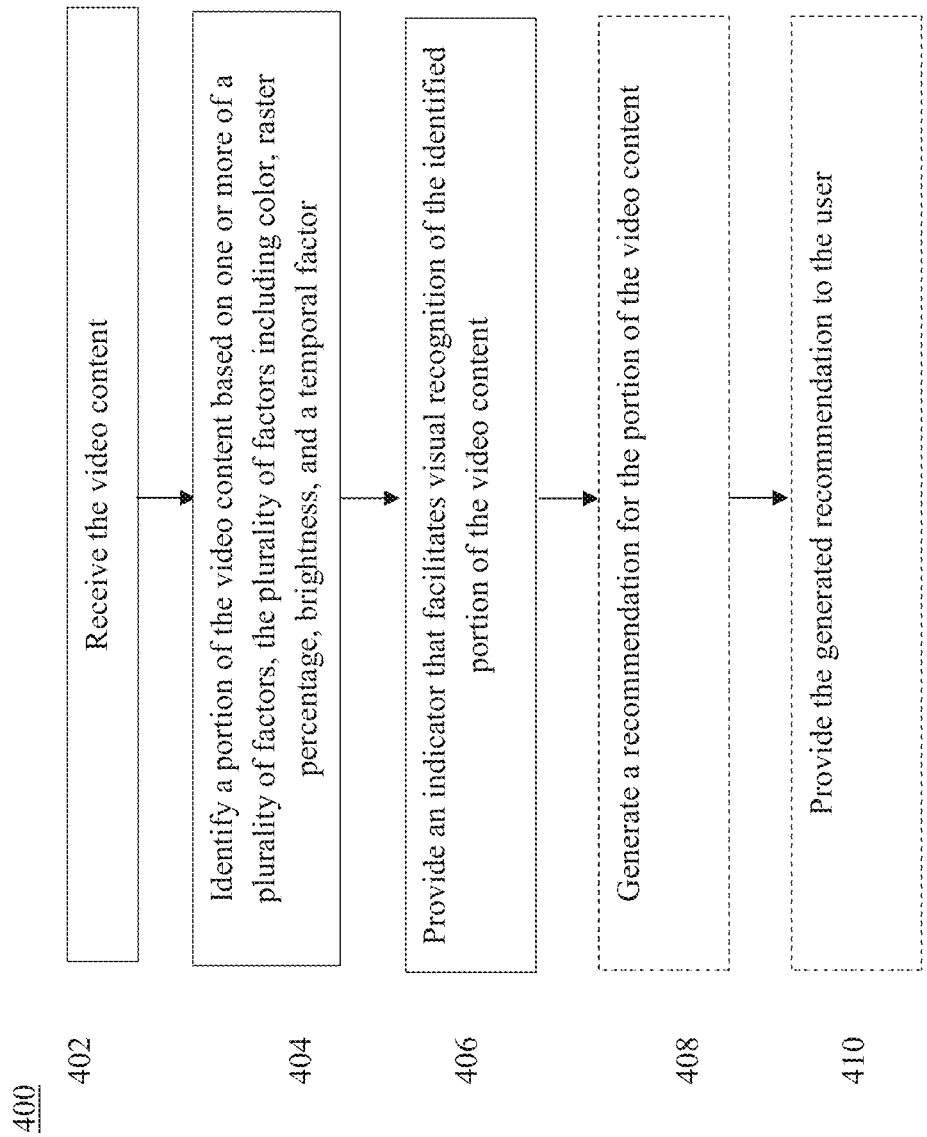
FIG. 4 illustrates a flowchart of a method for processing video content according to at least one embodiment.

FIG. 4 is a flowchart of a method 400 for processing video content according to at least one embodiment.

At block 402, video content is received. For example, where the video content may include HDR/WCG video content that is produced by a capture device (e.g., a video camera).

At block 404, a portion of the video content is identified based on one or more factors. Such factors include colour, raster percentage, brightness, and/or a temporal factor.

According to a further embodiment, identifying the portion of the video content includes: determining a colour associated with an object displayed in the portion of the video content; determining a raster percentage corresponding to the displayed object; determining a brightness threshold associated with the determined colour and the determined raster percentage of the portion of the video content; and measuring the brightness level of the video content.

According to a further embodiment, identifying the portion of the video content includes: determining a colour associated with an object displayed in the portion of the video content; identifying a colour group to which the determined colour corresponds; determining a raster percentage corresponding to the displayed object; determining a brightness threshold associated with the identified colour group and the determined raster percentage of the portion of the video content; and measuring the brightness level of the video content.

According to a further embodiment, identifying the portion of the video content includes: determining a colour associated with an object displayed in the portion of the video content; determining a raster percentage corresponding to the displayed object; determining a brightness threshold associated with the determined colour and the determined raster percentage of the portion of the video content; measuring the brightness level of the video content; determining a duration for which the portion of the video content is to be displayed; and determining a duration threshold based on at least one of the determined colour, the determined raster percentage, or the measured brightness level.

According to a further embodiment, identifying the portion of the video content includes: determining a colour associated with an object displayed in the portion of the video content; identifying a colour group to which the determined colour corresponds; determining a raster percentage corresponding to the displayed object; determining a brightness threshold associated with the identified colour group and the determined raster percentage of the portion of video content; measuring the brightness level of the video content; determining a duration for which the portion of the video content is to be displayed; and determining a duration threshold based on at least one of the determined colour group, the determined raster percentage, and the measured brightness level.

According to a further embodiment, identifying the portion of the video content includes identifying the portion based on the portion including display of an object having a brightness level that meets or exceeds a threshold.

At block 406, an indicator that facilitates visual recognition of the identified portion of the video content is provided.

For example, reference to FIG. 1, the visual indicator 102 is provided at the display screen 100. The location of the visual indicator 102 coincides with the portion of the content that is identified.

By way of example, the indicator may be a pattern that is overlaid or superimposed on top of the portion of the image of concern, where the pattern overlay is shown on the display of a capture device (e.g., a video camera).

As another example, the indicator may be directed to a user associated with the post-production or transmission (e.g., wireless transmission, broadcast transmission, etc.) of HDR/WCG content. In this example, the indicator may be a pattern overlaid or superimposed on top of the portion of the image within a display of a video editing room.

According to a further embodiment, providing the indicator includes: determining to generate the indicator for the portion of the video content based on the measured brightness level of the video content as compared to the determined brightness threshold, the determined colour, and the determined raster percentage; and generating the indicator to have a size sufficient to overlay the portion of the video content.

According to a further embodiment, providing the indicator includes: determining to generate the indicator for the portion of the video content based on the measured brightness level of the video content as compared to the determined brightness threshold, the determined colour group, and the determined raster percentage; and generating the indicator to have a size sufficient to overlay the portion of the video content.

According to a further embodiment, providing the indicator includes: determining to generate the indicator for the portion of the video content based on the measured brightness level of the video content as compared to the determined brightness threshold, the determined colour, the determined raster percentage, the determined duration, and the determined duration threshold; and generating the indicator to have a size sufficient to overlay the portion of the video content.

According to a further embodiment, providing the indicator further includes: determining to generate the indicator for the portion of the video content based on the measured brightness level of the video content as compared to the determined brightness threshold, the determined colour group, the determined raster percentage, the determined duration, and the determined duration threshold; and generating the indicator to have a size sufficient to overlay the portion of the video content.

According to a further embodiment, providing the indicator includes configuring a display device to display an overlay that coincides with the identified portion of the video content.

At block 408, a recommendation for the portion of the video content may be generated. The recommendation indicates at least one adjustment to a colour, raster percentage, brightness level, or the temporal factor associated with the portion of the video content. The recommendation enables a user to adjust the portion of the video content so that the portion is within acceptable video parameters and regulations.

At block 410, the generated recommendation is provided to the user.

Figure 5:
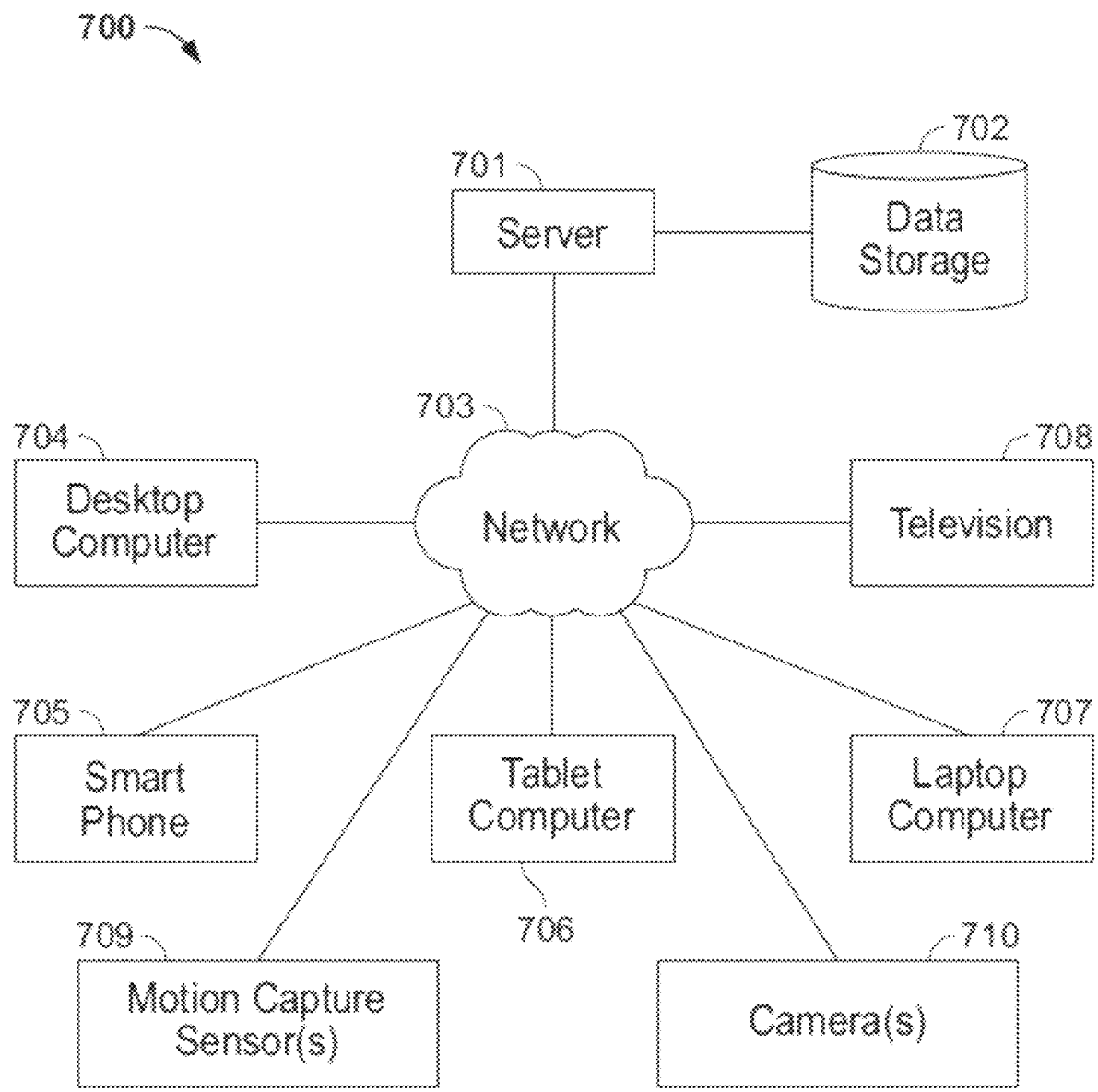
FIG. 5 is an illustration of a computing environment according to at least one embodiment.

In selected embodiments, features and aspects described herein may be implemented within a computing environment 700, as shown in FIG. 5, which may include one or more computer servers 701. The server 701 may be operatively coupled to one or more data stores 702 (e.g., databases, indexes, files, or other data structures). The server 701 may connect to a data communication network 703 including a local area network (LAN), a wide area network (WAN) (e.g., the Internet), a telephone network, a satellite or wireless communication network, or some combination of these or similar networks.

One or more client devices 704, 705, 706, 707, 708, 709, 710 may be in communication with the server 701, and a corresponding data store 702 via the data communication network 703. Such client devices 704, 705, 706, 707, 708, 709, 710 may include, for example, one or more laptop computers 707, desktop computers 704, smartphones and mobile phones 705, tablet computers 706, televisions 708, motion capture sensor(s) 709, camera(s) 710, or combinations thereof. In operation, such client devices 704, 705, 706, 707, 708, 709, 710 may send and receive data or instructions to or from the server 701 in response to user input received from user input devices or other input. In response, the server 701 may serve data from the data store 702, alter data within the data store 702, add data to the data store 702, or the like, or combinations thereof.

In selected embodiments, the server 701 may transmit one or more media files including audio and/or video content, encoded data, generated data, and/or metadata to/from the data store 702 from/to one or more of the client devices 704, 705, 706, 707, 708, 709, 710 via the data communication network 703. The devices may output the audio and/or video content from the media file using a display screen, projector, or other display output device. In certain embodiments, the system 700 configured in accordance with features and aspects described herein may be configured to operate within or support a cloud computing environment. For example, a portion of, or all of, the data store 702 and server 701 may reside in a cloud server.

Figure 6:
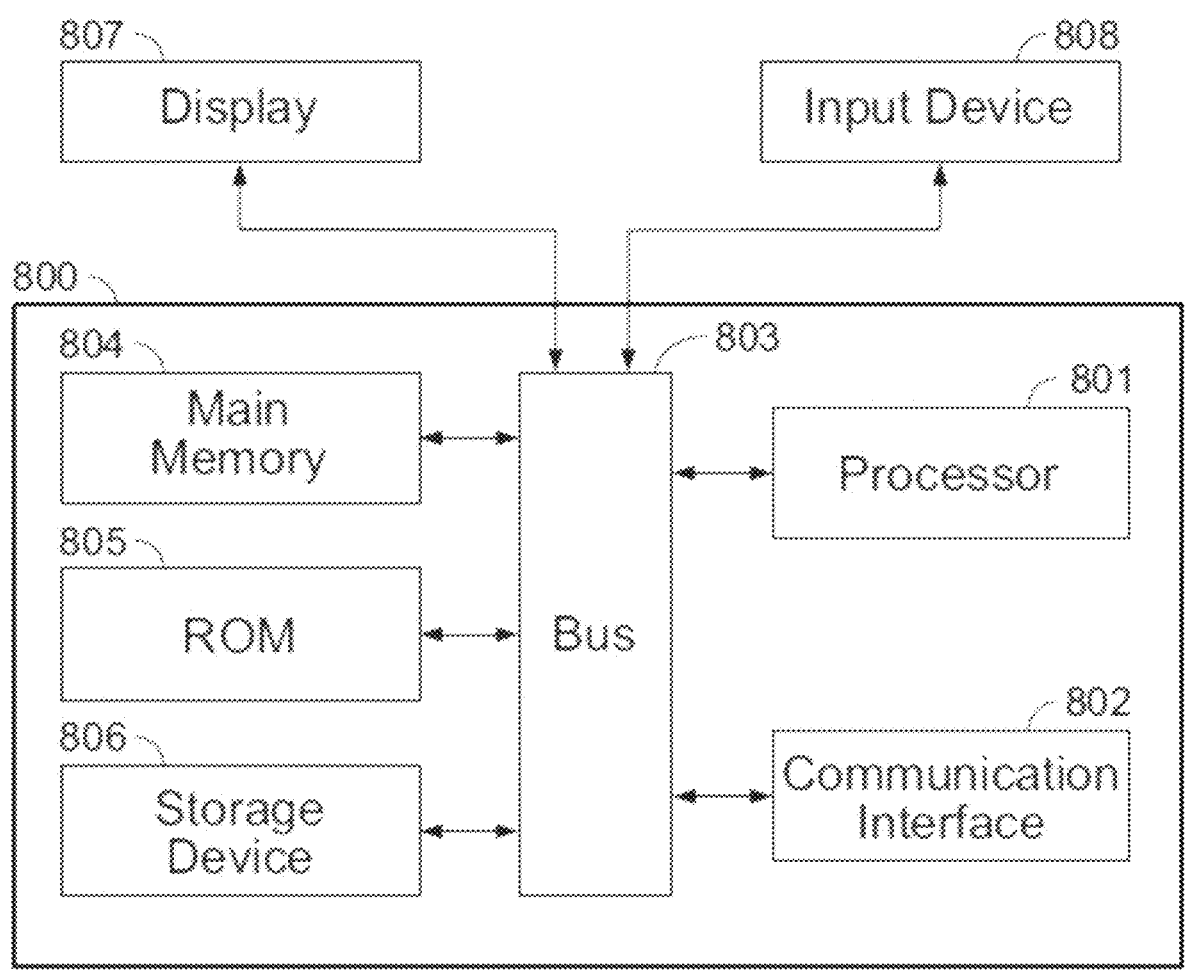
FIG. 6 is a block diagram of a device according to at least one embodiment.

With reference to FIG. 6, an illustration of an example computer 800 is provided. One or more of the devices 704, 705, 706, 707, 708 of the system 700 may be configured as or include such a computer 800.

In selected embodiments, the computer 800 may include a bus 803 (or multiple buses) or other communication mechanism, a processor 801, main memory 804, read only memory (ROM) 805, one or more additional storage devices 806, and/or a communication interface 802, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 803 or other communication mechanism, including multiple such buses or mechanisms, may support communication of information within the computer 800. The processor 801 may be connected to the bus 803 and process information. In selected embodiments, the processor 801 may be a specialized or dedicated microprocessor configured to perform particular tasks in accordance with the features and aspects described herein by executing machine-readable software code defining the particular tasks. Main memory 804 (e.g., random access memory—or RAM—or other dynamic storage device) may be connected to the bus 803 and store information and instructions to be executed by the processor 801. Main memory 804 may also store temporary variables or other intermediate information during execution of such instructions.

ROM 805 or some other static storage device may be connected to a bus 803 and store static information and instructions for the processor 801. The additional storage device 806 (e.g., a magnetic disk, optical disk, memory card, or the like) may be connected to the bus 803. The main memory 804, ROM 805, and the additional storage device 806 may include a non-transitory computer-readable medium holding information, instructions, or some combination thereof—for example, instructions that, when executed by the processor 801, cause the computer 800 to perform one or more operations of a method as described herein. The communication interface 802 may also be connected to the bus 803. A communication interface 802 may provide or support two-way data communication between the computer 800 and one or more external devices (e.g., other devices contained within the computing environment).

In selected embodiments, the computer 800 may be connected (e.g., via the bus 803) to a display 807. The display 807 may use any suitable mechanism to communicate information to a user of a computer 800. For example, the display 807 may include or utilize a liquid crystal display (LCD), light emitting diode (LED) display, projector, or other display device to present information to a user of the computer 800 in a visual display. One or more input devices 808 (e.g., an alphanumeric keyboard, mouse, microphone) may be connected to the bus 803 to communicate information and commands to the computer 800. In selected embodiments, one input device 808 may provide or support control over the positioning of a cursor to allow for selection and execution of various objects, files, programs, and the like provided by the computer 800 and displayed by the display 807.

The computer 800 may be used to transmit, receive, decode, display, etc. one or more video files. In selected embodiments, such transmitting, receiving, decoding, and displaying may be in response to the processor 801 executing one or more sequences of one or more instructions contained in main memory 804. Such instructions may be read into main memory 804 from another non-transitory computer-readable medium (e.g., a storage device).

Execution of sequences of instructions contained in main memory 804 may cause the processor 801 to perform one or more of the procedures or steps described herein. In selected embodiments, one or more processors in a multi-processing arrangement may also be employed to execute sequences of instructions contained in main memory 804. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 801, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 802 may provide or support external, two-way data communication to or via a network link. For example, the communication interface 802 may be a wireless network interface controller or a cellular radio providing a data communication network connection. Alternatively, the communication interface 802 may include a LAN card providing a data communication connection to a compatible LAN. In any such embodiment, the communication interface 802 may send and receive electrical, electromagnetic, or optical signals conveying information.

A network link may provide data communication through one or more networks to other data devices (e.g., client devices as shown in the computing environment 700). For example, a network link may provide a connection through a local network of a host computer or to data equipment operated by an Internet Service Provider (ISP). An ISP may, in turn, provide data communication services through the Internet. Accordingly, a computer 800 may send and receive commands, data, or combinations thereof, including program code, through one or more networks, a network link, and communication interface 802. Thus, the computer 800 may interface or otherwise communicate with a remote server (e.g., server 701), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for processing video content, the method comprising:

receiving the video content;
identifying a portion of the video content based on one or more of a plurality of factors; and
providing an indicator that facilitates visual recognition of the identified portion of the video content,
wherein identifying the portion of the video content comprises:
  determining a colour associated with an object displayed in the portion of the video content;
  determining a raster percentage corresponding to the displayed object;
  determining a brightness threshold associated with the determined colour and with the determined raster percentage of the portion of the video content; and
  measuring a brightness level of the video content, and
wherein providing the indicator comprises:
  determining to generate the indicator for the portion of the video content based on the measured brightness level of the video content as compared to the determined brightness threshold, the determined colour, and the determined raster percentage; and
  generating the indicator to have a size sufficient to overlay the portion of the video content.

2. The method of claim 1,
wherein identifying the portion of the video content further comprises:
  identifying a colour group to which the determined colour corresponds; and
  determining a second brightness threshold associated with the identified colour group and the determined raster percentage of the portion of the video content,
wherein providing the indicator further comprises:
  determining to generate the indicator for the portion of the video content based on the measured brightness level of the video content as further compared to the determined second brightness threshold, the determined colour group, and the determined raster percentage.

3. The method of claim 1,
wherein identifying the portion of the video content further comprises:
  determining a duration for which the portion of the video content is to be displayed; and
  determining a duration threshold based on at least one of the determined colour, the determined raster percentage, or the measured brightness level, and
wherein providing the indicator further comprises:
  determining to generate the indicator for the portion of the video content based on the measured brightness level of the video content as further compared to the determined brightness threshold, the determined colour, the determined raster percentage, the determined duration, and the determined duration threshold.

4. The method of claim 1,
wherein identifying the portion of the video content further comprises:
  identifying a colour group to which the determined colour corresponds;
  determining a second brightness threshold associated with the identified colour group and the determined raster percentage of the portion of video content;
  determining a duration for which the portion of the video content is to be displayed; and
  determining a duration threshold based on at least one of the determined colour group, the determined raster percentage, and the measured brightness level, and
wherein providing the indicator further comprises:
  determining to generate the indicator for the portion of the video content based on the measured brightness level of the video content as further compared to the determined second brightness threshold, the determined colour group, the determined raster percentage, the determined duration, and the determined duration threshold.

5. The method of claim 1, wherein the video content comprises High Dynamic Range (HDR) and Wide Colour Gamut (WCG) video content.

6. The method of claim 1, wherein identifying the portion of the video content further comprises identifying the portion based on an area of the video content having an area brightness level that meets or exceeds a threshold.

7. The method of claim 1, wherein providing the indicator further comprises configuring a display device to display an overlay that coincides with the identified portion of the video content.

8. The method of claim 1, further comprising:
  generating a recommendation for the portion of the video content, the recommendation indicating at least one of a colour adjustment, a raster percentage adjustment, a brightness level adjustment, or a temporal factor adjustment associated with the portion of the video content, wherein the recommendation enables a user to adjust the portion of the video content so that the portion is within acceptable video parameters and regulations; and
  providing the generated recommendation to the user.

9. The method of claim 1, wherein determining the raster percentage corresponding to the displayed object comprises determining the raster percentage to be less than 100%.

10. A system for facilitating processing of video content, the system comprising one or more processors configured to:
  receive the video content;
  identify a portion of the video content based on one or more of a plurality of factors; and
  provide an indicator that facilitates visual recognition of the identified portion of the video content,
wherein the one or more processors are further configured to identify the portion of the video content by:
  determining a colour associated with an object displayed in the portion of the video content;
  determining a raster percentage corresponding to the displayed object;
  determining a brightness threshold associated with the determined colour and the determined raster percentage of the portion of the video content; and
  measuring a brightness level of the video content, and
wherein the one or more processors are further configured to provide the indicator by:
  determining to generate the indicator for the portion of the video content based on the measured brightness level of the video content as compared to the determined brightness threshold, the determined colour, and the determined raster percentage; and
  generating the indicator to have a size sufficient to overlay the portion of the video content.

11. The system of claim 10,
wherein the one or more processors are further configured to identify the portion of the video content further by:

identifying a colour group to which the determined colour corresponds; and determining a second brightness threshold associated with the identified colour group and the determined raster percentage of the portion of the video content, and wherein the one or more processors are further configured to provide the indicator further by:

determining to generate the indicator for the portion of the video content based on the measured brightness level of the video content as further compared to the determined second brightness threshold, the determined colour group, and the determined raster percentage.

12. The system of claim 10, wherein the one or more processors are further configured to identify the portion of the video content further by:

determining a duration for which the portion of the video content is to be displayed; and determining a duration threshold based on at least one of the determined colour, the determined raster percentage, or the measured brightness level, and wherein the one or more processors are further configured to provide the indicator further by:

determining to generate the indicator for the portion of the video content based on the measured brightness level of the video content as further compared to the determined brightness threshold, the determined colour, the determined raster percentage, the determined duration, and the determined duration threshold.

13. The system of claim 10, wherein the one or more processors are further configured to identify the portion of the video content further by:

identifying a colour group to which the determined colour corresponds;

determining a second brightness threshold associated with the identified colour group and the determined raster percentage of the portion of video content;

determining a duration for which the portion of the video content is to be displayed; and determining a duration threshold based on at least one of the determined colour group, the determined raster percentage, and the measured brightness level, and wherein the one or more processors are further configured to provide the indicator further by:

determining to generate the indicator for the portion of the video content based on the measured brightness level of the video content as further compared to the determined second brightness threshold, the determined colour group, the determined raster percentage, the determined duration, and the determined duration threshold.

14. The system of claim 10, wherein the video content comprises High Dynamic Range (HDR) and Wide Colour Gamut (WCG) video content.

15. The system of claim 10, wherein the one or more processors are further configured to identify the portion of the video content further by identifying the portion based on an area of the video content having an area brightness level that meets or exceeds a threshold.

16. The system of claim 10, wherein the one or more processors are further configured to provide the indicator further by configuring a display device to display an overlay that coincides with the identified portion of the video content.

17. The system of claim 10, wherein the one or more processors are further configured to:

generate a recommendation for the portion of the video content, the recommendation indicating at least one of a colour adjustment, a raster percentage adjustment, a brightness level adjustment, or a temporal factor adjustment associated with the portion of the video content, wherein the recommendation enables a user to adjust the portion of the video content so that the portion is within acceptable video parameters and regulations; and provide the generated recommendation to the user.

18. A machine-readable non-transitory medium having stored thereon machine-executable instructions for processing video content, the instructions comprising:

receiving the video content;

identifying a portion of the video content based on one or more of a plurality of factors; and providing an indicator that facilitates visual recognition of the identified portion of the video content, wherein identifying the portion of the video content comprises:

determining a colour associated with an object displayed in the portion of the video content;

determining a raster percentage corresponding to the displayed object;

determining a brightness threshold associated with the determined colour and with the determined raster percentage of the portion of the video content; and measuring a brightness level of the video content, and wherein providing the indicator comprises:

determining to generate the indicator for the portion of the video content based on the measured brightness level of the video content as compared to the determined brightness threshold, the determined colour, and the determined raster percentage; and generating the indicator to have a size sufficient to overlay the portion of the video content.

* * * * *